US012129935B2

(12) United States Patent
Harbrecht et al.

(10) Patent No.: US 12,129,935 B2
(45) Date of Patent: *Oct. 29, 2024

(54) HIGH-FLOW FLUID VALVE BLOCK

(71) Applicant: Tosoh Bioscience LLC, King of Prussia, PA (US)

(72) Inventors: Brian A. Harbrecht, Janesville, WI (US); Robert Charles Mierendorf, Verona, WI (US); Scott G. Manke, Sun Prairie, WI (US)

(73) Assignee: Tosoh Bioscience LLC, King Of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/196,321

(22) Filed: May 11, 2023

(65) Prior Publication Data

US 2023/0358322 A1 Nov. 9, 2023

Related U.S. Application Data

(63) Continuation of application No. 17/338,934, filed on Jun. 4, 2021, now Pat. No. 11,703,133, which is a
(Continued)

(51) Int. Cl.
*F16K 7/17* (2006.01)
*B01D 15/18* (2006.01)
(Continued)

(52) U.S. Cl.
CPC ............ *F16K 7/17* (2013.01); *B01D 15/1842* (2013.01); *B01D 15/22* (2013.01); *F16K 11/22* (2013.01);
(Continued)

(58) Field of Classification Search
CPC .... F16K 27/0263; F16K 7/17; F16K 27/0236; B01D 15/22; B01D 15/1842;
(Continued)

(56) References Cited

U.S. PATENT DOCUMENTS 2,877,791 A 3/1959 Rich
3,792,720 A 2/1974 Robbins
(Continued)

FOREIGN PATENT DOCUMENTS

CN 1046716 A 11/1990
CN 201526718 U 7/2010
(Continued)

OTHER PUBLICATIONS

International Preliminary Report on Patentability for PCT/US2015/063109, mailed Jun. 13, 2017.
(Continued)

*Primary Examiner* — Michael R Reid
(74) *Attorney, Agent, or Firm* — Foley & Lardner LLP

(57) ABSTRACT

A valve block includes a fluid-transfer plate with multiple inlet bores connecting to a common inlet channel, and multiple outlet bores connecting to a common outlet channel. The inlet bores and the outlet bores are arranged in a curved shape. The valve block also includes a pressure plate and diaphragm aligned and connected to the fluid-transfer plate in a way that allows pressurized material in the pressure plate to control the state of the channels formed by the inlet and outlet bores.

20 Claims, 13 Drawing Sheets

Related U.S. Application Data continuation of application No. 16/550,550, filed on Aug. 26, 2019, now Pat. No. 11,054,045, which is a continuation of application No. 15/102,989, filed as application No. PCT/US2014/069580 on Dec. 10, 2014, now Pat. No. 10,393,276.

(60) Provisional application No. 61/914,164, filed on Dec. 10, 2013.

(51) Int. Cl.
| | | |
|---|---|---|
| *B01D 15/22* | (2006.01) | |
| *F16K 11/22* | (2006.01) | |
| *F16K 25/00* | (2006.01) | |
| *F16K 27/00* | (2006.01) | |
| *F16K 27/02* | (2006.01) | |
| *F16K 31/126* | (2006.01) | |

(52) U.S. Cl.
CPC .......... *F16K 25/005* (2013.01); *F16K 27/003* (2013.01); *F16K 27/0236* (2013.01); *F16K 27/0263* (2013.01); *F16K 31/1266* (2013.01)

(58) Field of Classification Search
CPC ..... Y10T 137/87893; Y10T 137/87716; Y10T 137/87249
USPC ......................................... 137/885, 863, 597
See application file for complete search history.

(56) References Cited

U.S. PATENT DOCUMENTS

| | | | |
|---|---|---|---|
| 3,844,529 | A | 10/1974 | Brandt, Jr. et al. |
| 3,856,046 | A | 12/1974 | Brown |
| 4,098,490 | A | 7/1978 | Morrison |
| 4,119,120 | A | 10/1978 | Mehaffy et al. |
| 4,168,724 | A | 9/1979 | Graffunder et al. |
| 4,274,452 | A | 6/1981 | Schmitt |
| 4,353,243 | A | 10/1982 | Martin |
| 4,431,019 | A | 2/1984 | Kopp et al. |
| 4,558,845 | A | 12/1985 | Hunkapiller |
| 4,846,215 | A | 7/1989 | Barree |
| 4,852,851 | A | 8/1989 | Webster |
| 4,858,883 | A | 8/1989 | Webster |
| 4,917,348 | A | 4/1990 | Phallen et al. |
| 5,088,515 | A | 2/1992 | Kamen |
| 5,496,009 | A | 3/1996 | Farrell et al. |
| 5,660,370 | A | 8/1997 | Webster |
| 6,834,675 | B1 | 12/2004 | Gill |
| 7,544,293 | B2 | 6/2009 | Oroskar et al. |
| 7,607,641 | B1 | 10/2009 | Yuan |
| 7,790,040 | B2 | 9/2010 | Mierendorf et al. |
| 8,104,506 | B2 | 1/2012 | Gamache et al. |
| 8,196,603 | B2 | 6/2012 | Wilke et al. |
| 8,251,347 | B2 | 8/2012 | Schmit et al. |
| 8,807,164 | B2 | 8/2014 | Baier et al. |
| 9,447,890 | B2 | 9/2016 | Jennings et al. |
| 10,393,276 | B2 | 8/2019 | Harbrecht et al. |
| 10,451,188 | B2 | 10/2019 | Harbrecht et al. |
| 11,054,045 | B2 | 7/2021 | Harbrecht et al. |
| 11,174,952 | B2 | 11/2021 | Harbrecht et al. |
| 11,703,133 | B2 * | 7/2023 | Harbrecht ............. F16K 27/003 137/859 |
| 2003/0117890 | A1 | 6/2003 | Dearing et al. |
| 2007/0128061 | A1 | 6/2007 | Gashgaee et al. |
| 2008/0053543 | A1 | 3/2008 | Baier et al. |
| 2008/0142091 | A1 | 6/2008 | Meinig et al. |
| 2010/0043891 | A1 | 2/2010 | Wilke et al. |
| 2016/0312907 | A1 | 10/2016 | Mierendorf et al. |

FOREIGN PATENT DOCUMENTS

| | | |
|---|---|---|
| CN | 101813206 A | 8/2010 |
| EP | 2 009 335 A2 | 12/2008 |
| JP | 36-005237 B | 5/1961 |
| JP | S5891067 U | 6/1983 |
| JP | 06-510355 A | 11/1994 |
| JP | 3029515 U | 10/1996 |
| JP | 2010-230159 A | 10/2010 |
| WO | WO-2012/178132 A1 | 12/2012 |

OTHER PUBLICATIONS

International Preliminary Report on Patentability issued on PCT/US2014/069580, mailed Jun. 14, 2016.
International Search Report and Written Opinion on PCT/US2014/069580, mailed Mar. 17, 2015.
International Search Report and Written Opinion on PCT/US2015/063109, mailed Feb. 4, 2016.

* cited by examiner

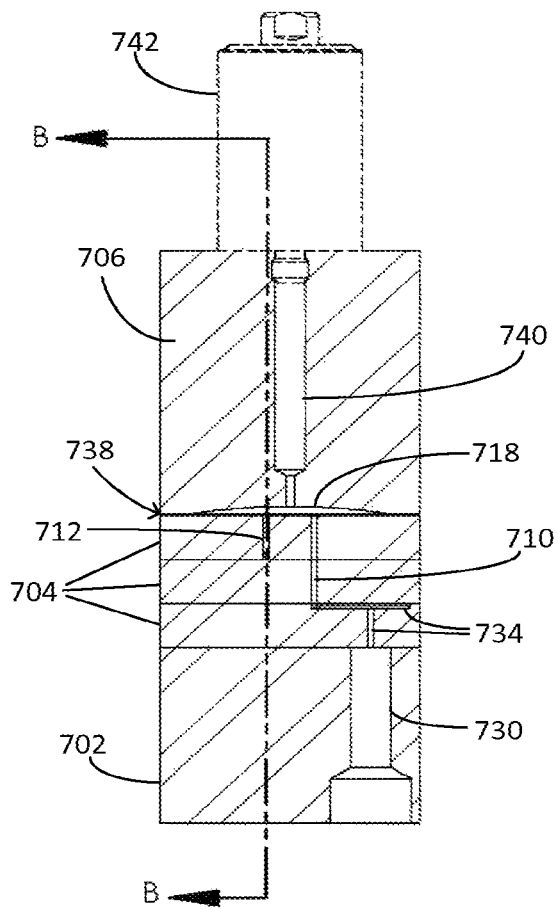 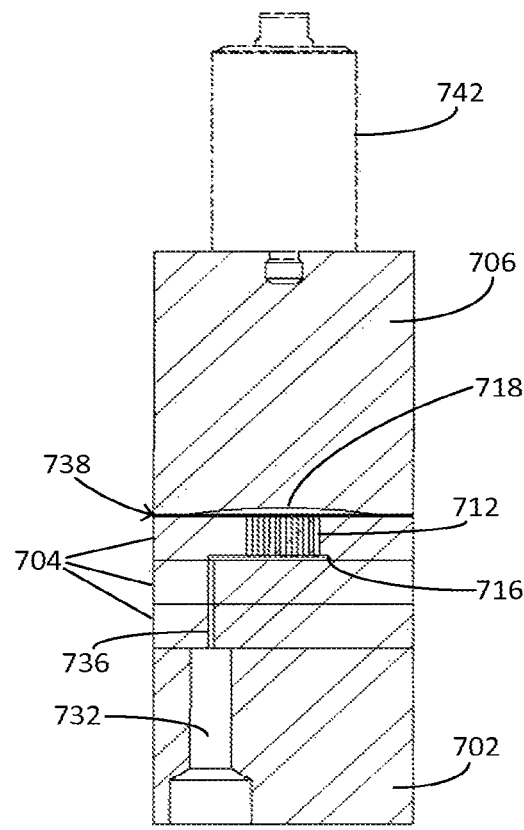
Fig. 8A
Fig. 8B
SECTION B-B

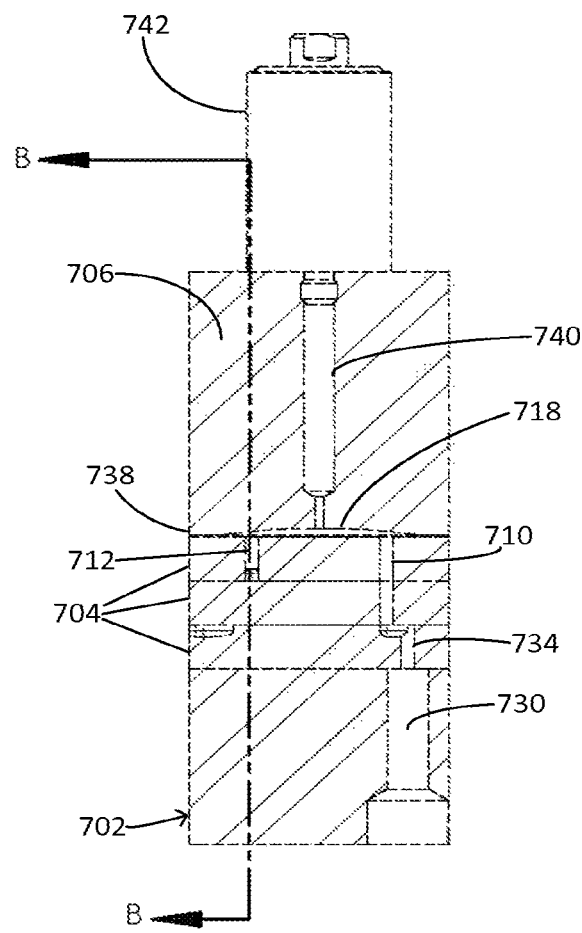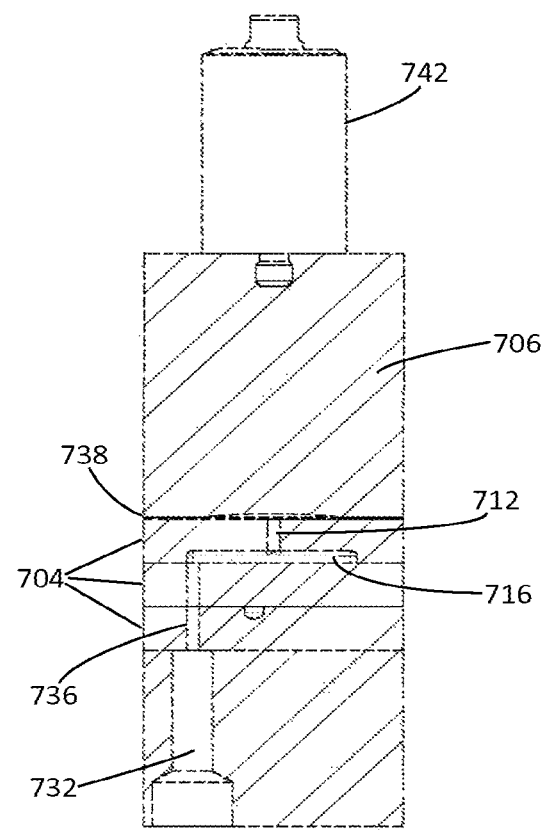
Fig. 10A
SECTION B-B
Fig. 10B

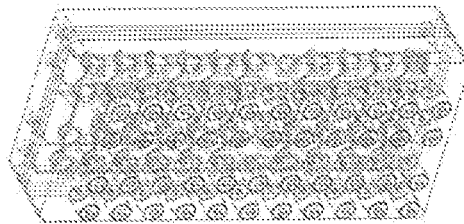
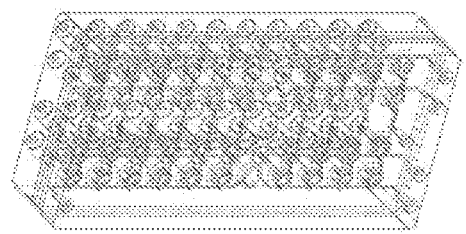
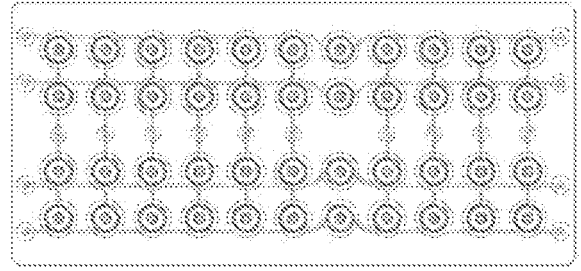
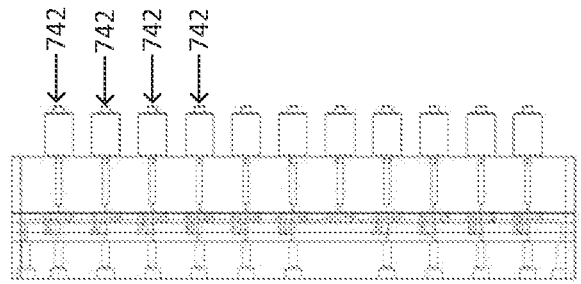
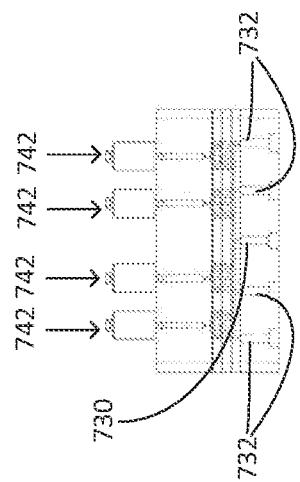
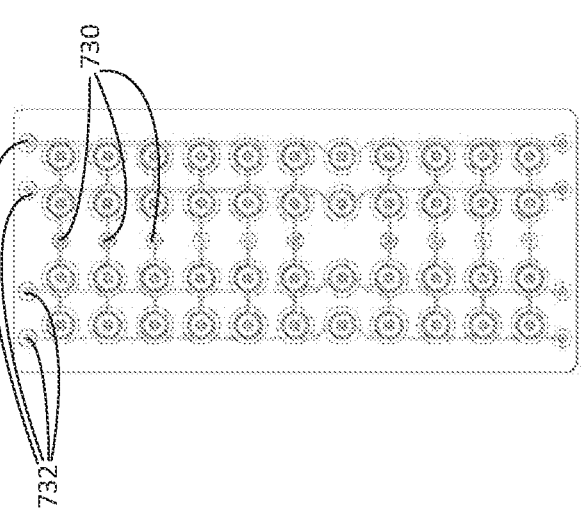

Section B-B

| Bore Diameter | 20C 150 psi | Pressure Increase | 20C 300 psi | Pressure Increase | 65C 150 psi | Pressure Increase | 65C 300 psi | Pressure Increase |
|---|---|---|---|---|---|---|---|---|
| 0.05 | 0 | 0% | 0 | 0% | 0.0012 | 2.4% | 0.0013 | 2.7% |
| 0.063 | 0 | 0% | 0 | 0% | 0.0016 | 3.8% | 0.0025 | 8.1% |
| 0.07 | 0 | 0% | 0.0008 | 3.9% | 0.0019 | 5.3% | 0.0035 | 11.6% |
| 0.075 | 0.0011 | 2.3% | 0.0020 | 5.0% | 0.0044 | 14.6% | 0.0071 | 34.8% |
| 0.094 | 0.0038 | 8.7% | 0.0051 | 13.7% | 0.0078 | 31.4% | 0.0122 | 144% |
| 0.099 | 0.0049 | 20.1% | 0.0059 | 29.1% | 0.0069 | 38.9% | 0.0139 | 939% |

Fig. 13

HIGH-FLOW FLUID VALVE BLOCK

CROSS REFERENCE TO RELATED APPLICATIONS

This application is a continuation of U.S. patent application Ser. No. 17/338,934, filed Jun. 4, 2021, which is a continuation of U.S. patent application Ser. No. 16/550,550 (now U.S. Pat. No. 11,054,045), filed Aug. 26, 2019, which is a continuation of U.S. patent application Ser. No. 15/102,989 (now U.S. Pat. No. 10,393,276), filed Jun. 9, 2016, which is a National Stage of Int'l App. No. PCT/US2014/069580, filed Dec. 10, 2014, which claims priority from U.S. Provisional App. No. 61/914,164, filed Dec. 10, 2013, each of which of the foregoing being incorporated herein by reference in its respective entirety.

BACKGROUND

Simulated moving bed (SMB) chromatography utilizes a number of interconnecting adsorbent beds (columns) containing solid phase chromatography media. Inlet ports for feedstock, desorbent, and other optional input streams and outlet ports for raffinate, extract, and other optional output streams are placed at specific points in the series of columns, and a series of valves and tubing and/or channels between the columns connects flow of the mobile phase to provide a continuous loop. Liquid flow is controlled by two or more pumps connected to the inlet and/or outlet streams. At defined intervals, the positions of the inlet and outlet ports are switched in the same direction as the flow, simulating a countercurrent movement of the solid phase relative to the mobile phase. Feedstock introduced into the first column begins to separate into components contained therein as flow ensues, with less retained species migrating in the direction of fluid flow and being collected at the raffinate port. The more retained species remains preferentially associated with the solid phase and is collected at the extract port. By regulating the switch times and flow rates of feedstock, desorbent, raffinate, and extract, a standing wave pattern is established, allowing for continuous flow of separated products from the system. The number of input streams, output streams, and operations performed in the columns can be modified according to the requirements of the separation and capabilities of the valving system. For example, in addition to a 2-input, 2-output SMB process performed under isocratic conditions, with an appropriate valve system it is possible to perform continuous multicolumn processes which utilize different solvent conditions (or solutions) in different columns, such as in affinity chromatography where a target protein binds to the solid phase in a first solution, contaminants are washed away in a second solution, the target protein is eluted in a third solution, and the solid phase is regenerated in a fourth solution.

For large scale industrial systems, the bed volume is so great compared to void volumes of liquid between columns that even elaborate valve systems involving extensive conduits do not interfere with the process. There has been a recent trend, however, in scaling SMB smaller to pilot and sub-pilot volumes, as the need for more sophisticated applications has arisen in the fine chemicals and pharmaceutical fields requiring gram to kilogram quantities of product.

SUMMARY

In an illustrative embodiment, an example valve block is disclosed. The valve block includes a fluid-transfer plate, a pressure plate, and a diaphragm disposed between the fluid-transfer plate and the pressure plate. The pressure plate includes a recess fillable with a material on a first side of the pressure plate. The fluid transfer plate includes an inlet channel, an outlet channel, a plurality of inlet bores extending from the inlet channel to a second side of the fluid transfer plate, and a plurality of outlet bores extending from the outlet channel to the second side of the fluid transfer plate. Both the inlet bores and the outlet bores are arranged in a curved shape. The inlet channel, the outlet channel, the plurality of inlet bores, and the plurality of outlet bores are contained within a valve of the valve block. The diaphragm is disposed between the first side of the pressure plate and the second side of the fluid transfer plate. The diaphragm is configured to prevent fluid flow from at least one of the plurality of inlet bores to at least one of the plurality of outlet bores when the recess is filled with the material.

In another illustrative embodiment, an example valve block is disclosed. The valve block includes a plurality of valves, each including an inlet channel and an outlet channel formed into a first surface of the fluid-transfer plate. The plurality of valves additionally includes a plurality of inlet bores extending from the inlet channel to a second surface of the fluid-transfer plate and a plurality of outlet bores extending from the outlet channel to the second surface of the fluid-transfer plate. Both the inlet bores and the outlet bores are arranged in a curved shape. The plurality of valves further includes a recess fillable with a material on a first surface of a pressure plate and a diaphragm disposed between the second surface of the fluid-transfer plate and the first surface of the pressure plate. The diaphragm is configured to selectively control flow of a fluid from the plurality of inlet bores to the plurality of outlet bores.

BRIEF DESCRIPTION OF THE DRAWINGS

Illustrative embodiments of the invention will hereafter be described with reference to the accompanying drawings, wherein like numerals denote like elements.

FIGS. 8A and 8B show cross-sections of an assembled valve block with seven inlet bores and seven outlet bores in accordance with an illustrative embodiment.

FIGS. 10A and 10B show cross-sections of an assembled valve block with five inlet bores and five outlet bores in accordance with an illustrative embodiment.

FIGS. 11A-11F show various views of an assembled valve block comprising multiple valves in accordance with an illustrative embodiment.

FIG. 13 is a table that shows the results of an experiment regarding deformation of a diaphragm of a valve in accordance with an illustrative embodiment.

DETAILED DESCRIPTION

Figure 1:
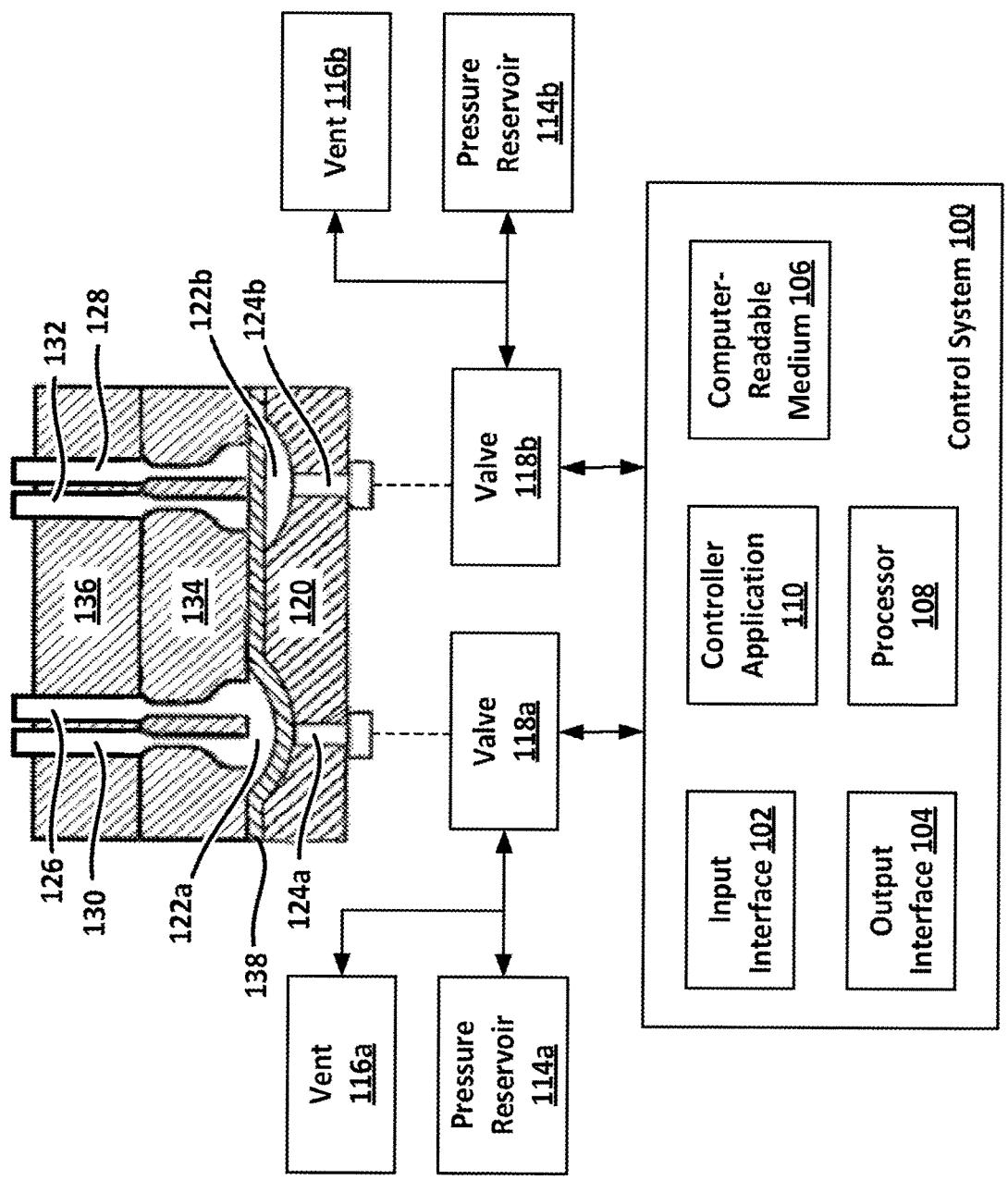
FIG. 1 shows a block diagram of a control system interacting with a simplified valve system in accordance with an illustrative embodiment.

In designing specialized valve systems for controlling the scaled-down SMB applications, the present inventors have recognized several issues with the current valve designs. For example, typical valves that employ moving parts, such as rotary valves, encounter the problem that fluid and solute mixtures tend to have a deleterious effect on the reliability of moving parts and, therefore, on the reliability of the valves. As another example, systems that employ flexible diaphragms (or membranes) may also suffer reliability issues due to over-stretching of the diaphragm or contact between the diaphragm and edges/corners of structures on the plates. Further still, some valve systems generate unacceptably high pressure and/or fluid linear velocity at flow rates required for various applications.

Some applications for valve systems with a flexible diaphragm require flow rates and/or pressures that are higher than existing flexible diaphragm valve systems can accommodate. For example, existing diaphragm valve systems can have a maximum flow rate on the scale of milliliters per minute (e.g., up to 500 milliliters/minute (mL/min)) or 100 pounds per square inch (psi) fluid pressure. Various embodiments of the present disclosure can accommodate flow rates on the scale of liters per minute (e.g., 2.5 liters/minute (L/min)) and 290 pounds per square inch (psi) fluid pressure. For example, in an illustrative embodiment of the present disclosure, a valve block can be operated between ambient temperatures (e.g., 20° Celsius (C)–25° C.) and 65° C. with flow rates between 0.1 mL/min and 2.5 L/min at fluid pressures up to 290 pounds per square inch (psi). An example fluid that flows through the valve block can have no suspended solids and can range from 0.2 centipoise (cP)-3 cP viscosity. In some embodiments, the viscosity of the fluid can be greater than 3 cP. One specific example can be for monoclonal antibody (mAb) capture from a culture fluid on a production scale. In such an example, the valve block can be operated at flow rates between 100 mL/min and 2.5 L/min with an aqueous process fluid with protein concentrations up to 25 milligrams/milliliter (mg/mL), with up to 1 molar (M) sodium chloride (NaCl), 0.1 M sodium hydroxide (NaOH), and with pH values ranging from 1 to 12.

This disclosure generally relates to systems, structures, and methods associated with fluid-transfer valves. In some embodiments, a group of valves is formed by sandwiching a pliant diaphragm between a fluid-transfer plate and a pressure plate. Each plate may be designed and machined to have specialized channels and bores to direct fluid flow. The fluid-transfer plate (which can also be referred to as the upper plate) contains at least two channels etched or otherwise formed into its flat upper surface, with each channel connecting to fluid connectors above the fluid-transfer plate. Multiple bores are machined or otherwise formed through the fluid-transfer plate, along the length of each of the channels to the flat lower surface of the fluid-transfer plate. In operation, a fluid may be introduced into one channel from one of the fluid connectors and, if a fluid valve associated with the channel is open, then the fluid may flow down through the bores to the lower surface of the fluid-transfer plate. On the lower surface of the plate, the flow is directed from the bores that connect to the first channel, through bores that connect with a second channel, and up into the fluid connector that connects to the second channel. The first channel acts as an inlet for the fluid and the second channel acts as an outlet.

The pressure plate, or lower plate (in some incorporated references the pressure plate may be referred to as the "upper pneumatic plate," "pneumatic plate," or "upper plate"), may contain recesses or dimples on its upper surface that can be positioned relative to the fluid-transfer plate such that each recess covers at least two bores on the bottom of the fluid-transfer plate. Each recess is coupled to a bore which is operably coupled to a valve that directs the flow of pressurized material. When pressurized material is forced into a recess, the diaphragm between the plates is pushed against the bottom of the fluid-transfer plate, pressing the diaphragm over the bores covered by the recess. Such a state may be termed a valve-closed state, because the fluid flow between the covered bores is blocked or closed.

When pressure is removed from the material in the recess, the fluid in the bores may push the diaphragm down into the recess, creating a channel through which fluid may flow between the bores covered by the recess. During this valve-open state, fluid may flow from bores connected to one fluid connection to bores connected to another connector. Therefore, by controlling the pressure applied to the material in the recesses, a system may control the flow of fluid between different connections.

Such a valve block may be used in any fluid transfer or control application in which a fluid valve is required. An example of a system in which such a valve could be applied is described in more detail in U.S. Pat. No. 7,790,040, which is incorporated herein by reference in its entirety. For this and other references incorporated by reference, features of any of the embodiments disclosed in the incorporated reference may be used in the described embodiments. Similar structures in each reference may be substituted with structures in another reference. In cases where the references disagree, the embodiments or language of the present disclosure will be controlling.

Example Valve Control System

With reference to FIG. 1, a block diagram of a control system 100 is shown in accordance with an illustrative embodiment. Control system 100 controls the operation of a valve system to direct the flow of fluid in a manner that simulates a moving bed. In some embodiments, control system 100 can be configured to control the operation of the valve system in accordance with any other fluid system comprising valves. Control system 100 implements a desired process by controlling the states (open or closed) of one or more valves of a valve block assembly and may also control the pumps that direct the flow of fluid into and out of the valve system. The components of control system 100 may be mounted to or otherwise connect to an electronics board in the valve system. Control system 100 may include an input interface 102, an output interface 104, a computer-readable medium 106, a processor 108, and a controller application 110.

Different and/or additional components may be incorporated into control system 100. For example, control system 100 may further include a communication interface. Components of control system 100 may be mounted to the valve system or mounted in a separate device or set of devices. As a result, the communication interface can provide an interface for receiving and transmitting data between the valve system and one or more additional devices hosting components of control system 100 using various protocols, transmission technologies, and media. The communication interface may support communication using various transmission media that may be wired or wireless. Thus, the components of control system 100 may be connected as appropriate using wires or other coupling methods or wirelessly and may be positioned locally or remotely with respect to the valve system.

Input interface 102 provides an interface for receiving user-input and/or machine instructions for entry into control system 100 as known to those skilled in the art. Input interface 102 may use various input technologies including, but not limited to, a keyboard, a pen and touch screen, a mouse, a track ball, a touch screen, a keypad, voice recognition, motion recognition, disk drives, remote controllers, input ports, one or more buttons, etc. to allow an external source, such as a user, to enter information into control system 100. The valve system may have one or more input interfaces that use the same or a different interface technology.

Output interface 104 provides an interface for presenting information from control system 100 to external systems, users, or memory as known to those skilled in the art. For example, output interface 104 may include an interface to a display, a printer, a speaker, etc. The output interface 104 may also include alarm/indicator lights, a network interface, a disk drive, a computer memory device, etc. The valve system may have one or more output interfaces that use the same or a different interface technology.

Computer-readable medium 106 is an electronic holding place or storage for information so that the information can be accessed by processor 108 as known to those skilled in the art. Computer-readable medium 106 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disk (CD), digital versatile disk (DVD), . . . ), smart cards, flash memory devices, etc. The valve system may have one or more computer-readable media that use the same or a different memory media technology. The valve system may have one or more drives that support the loading of a memory medium such as a CD, a DVD, a flash memory card, etc.

Processor 108 executes instructions as known to those skilled in the art. The instructions may be carried out by a special purpose computer, logic circuits, or hardware circuits. Thus, processor 108 may be implemented in hardware, firmware, software, or any combination of these methods. The term "execution" is the process of running an application or the carrying out of the operation called for by an instruction. The instructions may be written using one or more programming language, scripting language, assembly language, etc. Processor 108 executes an instruction, meaning that it performs the operations called for by that instruction. Processor 108 operably couples with input interface 102, output interface 104, computer-readable medium 106, controller application 110, etc. to receive, to send, and to process information and to control the operations of the valve system. Processor 108 may retrieve a set of instructions from a permanent memory device such as a ROM device and copy the instructions in an executable form to a temporary memory device that is generally some form of RAM. The valve system may include a plurality of processors that use the same or a different processing technology. In an illustrative embodiment, the instructions may be stored in computer-readable medium 106.

Controller application 110 includes operations which control the valve system and may provide a graphical user interface with selectable and controllable functionality to define the processes executed by the valve system. The operations may be implemented using hardware, firmware, software, or any combination of these methods. With reference to the illustrative embodiment of FIG. 1, controller application 110 is implemented in software stored in computer-readable medium 106 and accessible by processor 108 for execution of the computer-readable instructions that embody the operations of controller application 110. The computer-readable instructions of controller application 110 may be written using one or more programming languages, assembly languages, scripting languages, etc. The functionality provided by controller application 110 may be distributed among one or more modules and across one or more device. For example, controller application 110 may include a module that controls the opening and closing of one or more valves that is separate or integrated with a module that controls pump flow rates. Controller application 110 provides control signals to the plurality of electrical connectors, which connect to the valves as well as to the pumps associated with a plurality of pump connectors that apply pressure to fluid either entering the valve block at inlets 126 or 128 or exiting the valve block through outlets 130 or 132. Although numbered fluid paths 126-132 are referred to as "inlets" and "outlets," the illustrated structure and orientation of the inlets relative to the outlets should not be seen as limiting the ways that inlets and/or outlets are implemented. In some cases, fluid paths may be equivalent or identical in structure, such that users may change which fluid path is used as inlet and which is used as outlet to the valve. In some embodiments, the changing from inlet to outlet may be automated.

To produce the controlling pressure in each fluid valve, a gas valve is connected to a reservoir of pressurized gas and to a vent. For example, with reference to FIG. 1, a first gas valve 118a is shown connected to a first pressure reservoir 114a and a first vent 116a, and a second gas valve 118b is shown connected to a second pressure reservoir 114b and a second vent 116b. First pressure reservoir 114a and second pressure reservoir 114b may be the same or different. First vent 116a and second vent 116b may be the same or different. The one or more gas valves may be designed as normally open or may be designed as normally closed. Controller application 110 can be designed to support either method of valve operation. In an illustrative embodiment, the gas valves are normally closed and are switched at 24 volts. To reduce heat, the voltage applied to the gas valves may be stepped down to 12 volts or lower after switching while maintaining the state.

With further reference to FIG. 1, a simplified cross sectional view of a portion of a valve block is shown connected to first gas valve 118a and to second gas valve 118b to illustrate the operation of the valve states. Pressure plate 120 includes a first recess 122a and a second recess 122b coupled to a first gas channel 124a and a second gas channel 124b, respectively. First gas channel 124a and second gas channel 124b operably couple to first gas valve 118a and to second gas valve 118b, respectively. Fluid-transfer plate 134 and top plate 136 include a first fluid channel (comprised of inlet 126 and outlet 130) and a second fluid channel (comprised of inlet 128 and outlet 132). As shown with reference to FIG. 1, pneumatic pressure from second gas valve 118*b* applied to second recess 122*b* causes diaphragm 138 to stop the flow of fluid through the second fluid channel (i.e., from inlet 128 to outlet 132). Pneumatic pressure released by first gas valve 118*a* through first gas channel 124*a* allows fluid pressure through the first fluid channel from inlet 126 to deflect diaphragm 138 into first recess 122*a* thereby allowing the flow of fluid through the first fluid channel from inlet 126 to outlet 130.

Diaphragm 138 can be formed of a polymer that is sufficiently pliant to permit deflection when pneumatic pressure is relieved in a pressure channel, such as first gas channel 124*a*. Diaphragm 138 can be of a material chosen to be pliable, resistant to tearing and penetration, gas impermeable, and chemically resistant. For example, such deflection may be caused by fluid pressure from inlet 126. In that case, the pressure in first gas channel 124*a* could be an ambient air pressure, for instance, so that only the fluid pressure in the first gas channel 124*a* causes the deflection, rather than suction in first gas channel 124*a*. In an illustrative embodiment, diaphragm 138 may be naturally formed in a substantially flat shape, such that the first recess 122*a* is closed in the absence of a pressure differential. In other cases, diaphragm 138 may be preformed and/or may be naturally biased in an open (recessed) position in first recess 122*a*. In an illustrative embodiment, diaphragm 138 may be formed of perfluoroalkoxy (PFA) copolymer resin having a thickness of 0.01 inches. Alternatively, other materials and/or thicknesses may be used. In another illustrative embodiment, diaphragm 138 can be made of fluorinated ethylene propylene (FEP) copolymer resin.

Although some aspects of controlling a valve system are shown in FIG. 1, other aspects of an illustrative valve control system may be found in U.S. Pat. No. 7,806,137, which is incorporated herein by reference in its entirety.

Example Valve Block

Figure 2:
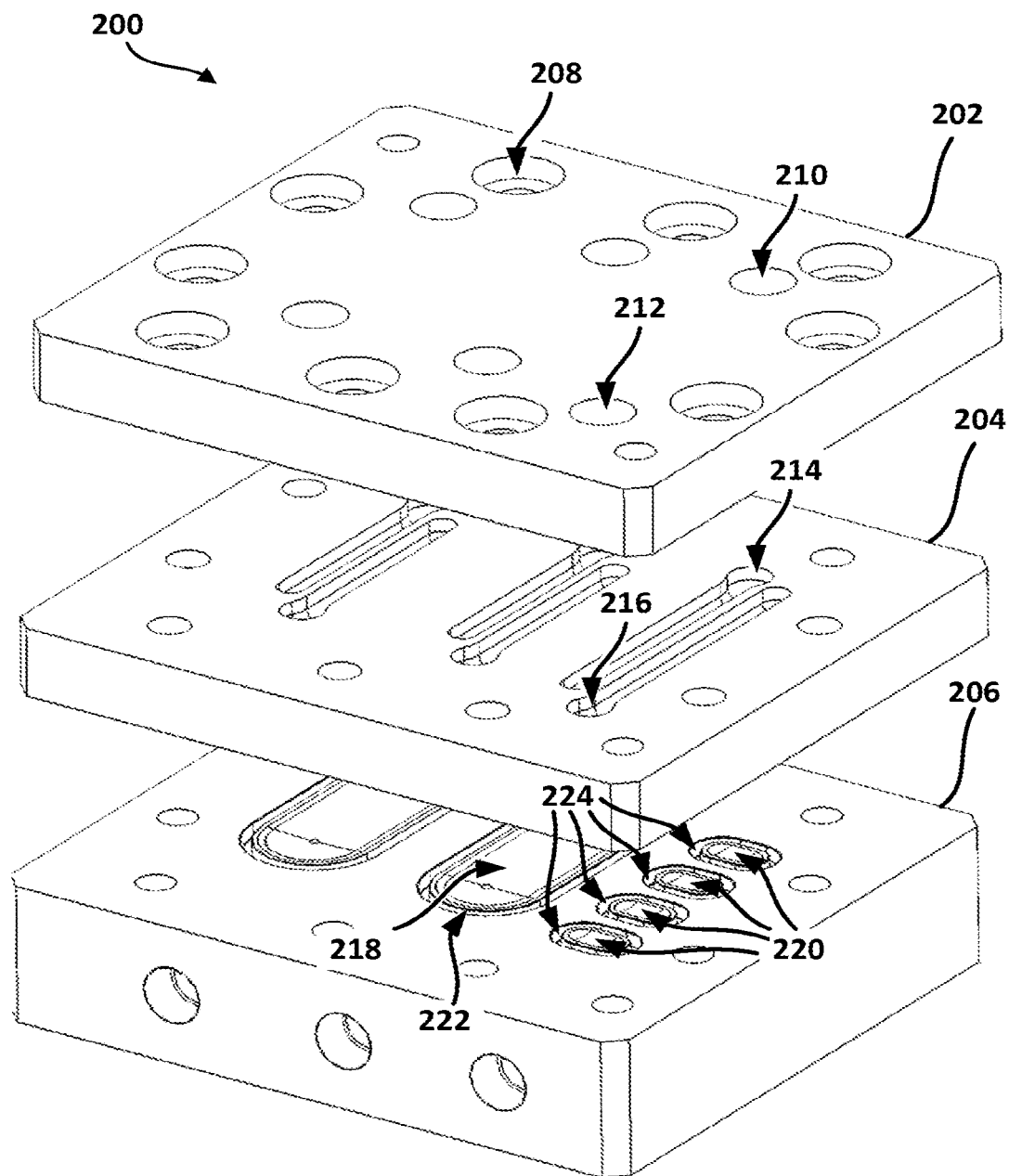
FIG. 2 shows a disassembled, exploded, perspective view of a valve block in accordance with an illustrative embodiment.

FIG. 2 shows an exploded view of a valve block 200 according to an illustrative embodiment. As shown, valve block 200 includes top plate 202, fluid-transfer plate 204, and pressure plate 206 with various passages, grooves, channels, and bores disposed in the plates. As will be shown with reference to FIG. 6, top plate 202, fluid-transfer plate 204, and pressure plate 206 may be joined to form a functional valve block that includes diaphragm 602.

Top plate 202 of valve block 200 has bores formed therethrough, which align with features of fluid-transfer plate 204 and/or pressure plate 206. For example, bore 208 may align with corresponding bores through top plate 202 and pressure plate 206 to provide a cavity through which structural supports may be placed. As another example, bore 210 and bore 212 may provide fluid passages for receiving and expelling fluids to/from valve block 200. In particular, bore 210 and bore 212 may be aligned with channel 214 and channel 216, respectively, which are cut or otherwise formed in fluid-transfer plate 204. In use, then, fluid may enter the valve block through one of bore 210 or bore 212 and be input into channel 214 or channel 216.

Top plate 202, fluid-transfer plate 204, and/or pressure plate 206 can be made of any material that is inert and structurally rigid enough for the valve block 200 to form the necessary seals between the various plates. Bore 208 can be used to create a compressive force between top plate 202, fluid-transfer plate 204, and pressure plate 206. Bore 208 can also be used to align the various plates and prevent one or more of the plates from creeping out of place after initial alignment. For example, top plate 202 can be made of stainless steel. In some embodiments, top plate 202, fluid transfer plate 204, and/or pressure plate 206 can be made of material that is less structurally rigid and alternative methods can be used to create a compressive force between the various plates to form the necessary seals and prevent creeping. For example, a clamp can be used. In another example, a valve body housing can be used. In such embodiments, top plate 202, fluid transfer plate 204, and/or pressure plate 206 can be made of aluminum or plastic. If plastic is used, the plastic can be Class VI plastic that can be used in pharmaceutical processes and/or can be biocompatible. Examples of such plastics include polyetherimide (PEI), polycarbonate (PC), acetal copolymer, polypropylene (PP), polyether ether ketone (PEEK), perfluoroalkoxy (PFA), polysulfone (PSU), polyphenylsulfone (PPSU), cyclic olefin copolymer (COC), polytetrafluoroethylene (PTFE), etc. In some embodiments, top plate 202, fluid transfer plate 204, and pressure plate 206 can all be made of the same or similar material. In other embodiments, the various plates can have materials of construction that vary from one another.

Additionally, the surfaces of top plate 202, fluid-transfer plate 204, and pressure plate 206 can be machined (or otherwise finished) to have a smooth finish. In some embodiments, the surface finish can have a roughness average (Ra) of 8 microinches. The smooth finish can be provided to create a seal where two plates touch. In some embodiments, instead of a smooth finish, a chemically compatible and/or biocompatible gasket can be used.

Figure 3:
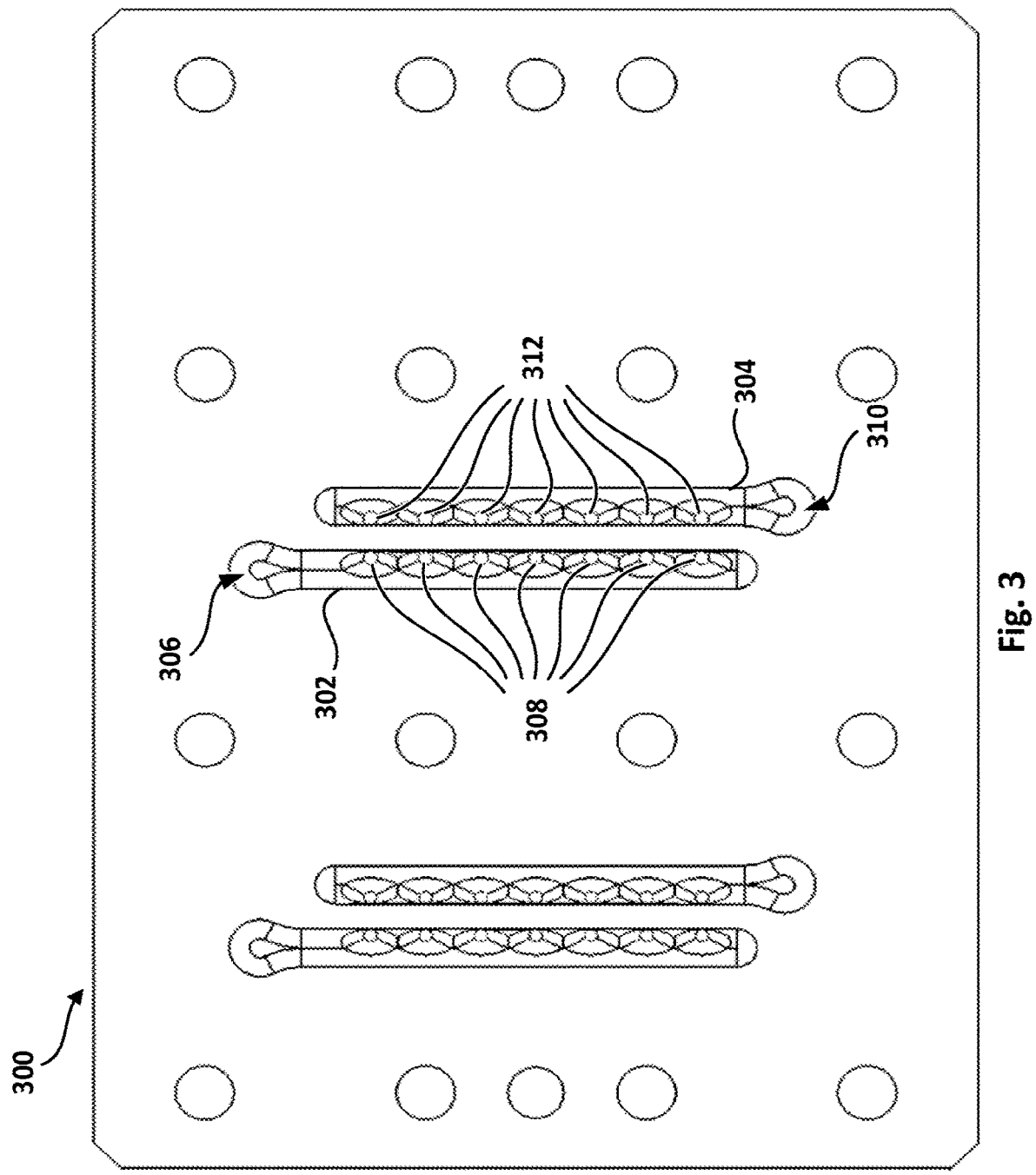
FIG. 3 shows a top-perspective view of a fluid-transfer plate in a valve block according to an illustrative embodiment.
Figure 4:
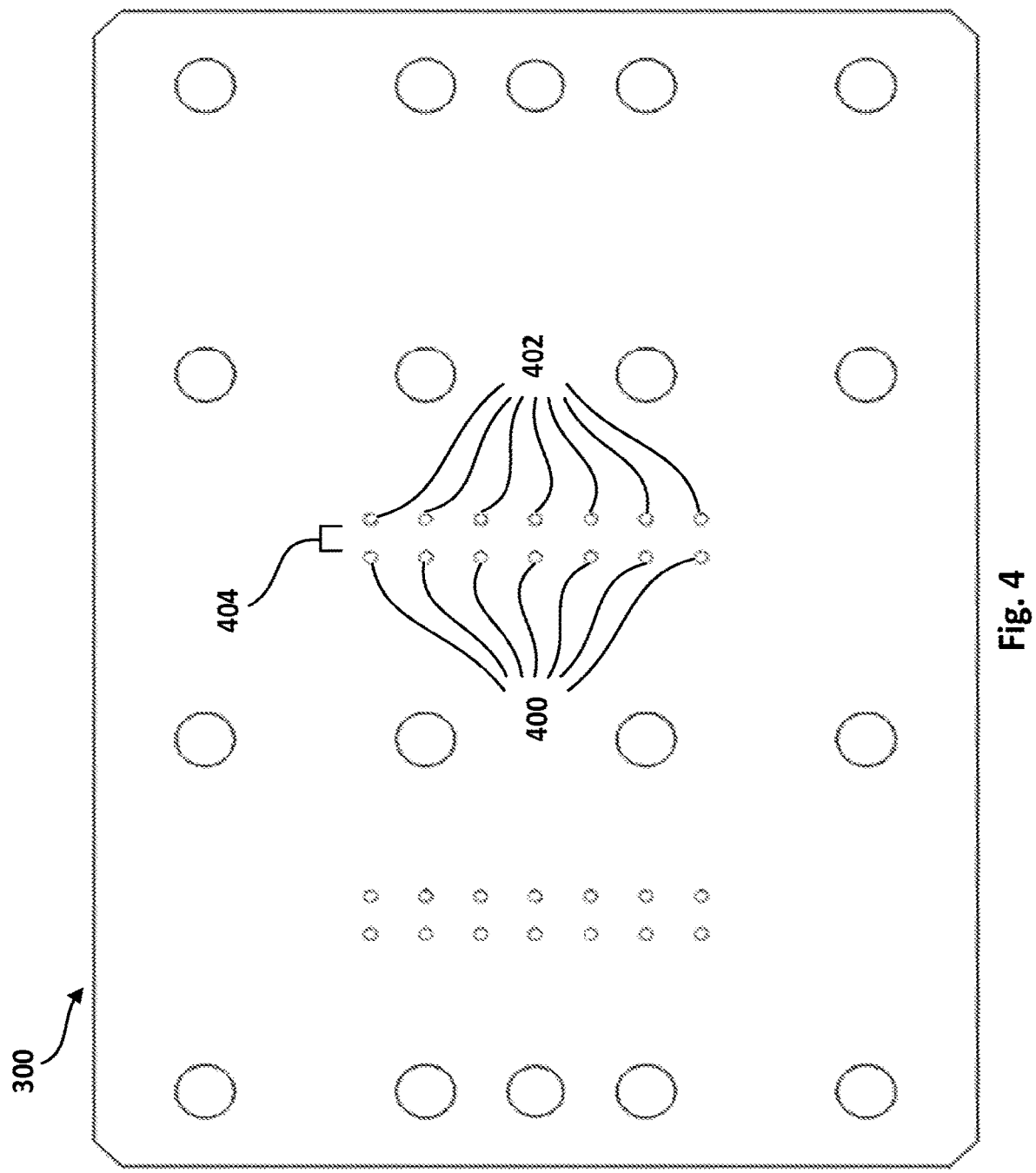
FIG. 4 shows a bottom perspective view of a fluid-transfer valve according to an illustrative embodiment.

Fluid-transfer plate 204, as will be shown in more detail in FIGS. 3 and 4, may include features for facilitating and controlling fluid flow through valve block 200. As shown, fluid-transfer plate 204 may include channel 214 and channel 216 that may function as common inlet or outlet channels for fluid from bore 210 and/or bore 212. Though not shown in FIG. 2, channel 214 and channel 216 may each connect to multiple bores that extend through fluid-transfer plate 204. The combination of bore 210 and bore 212 with channel 214 and channel 216 (including the bores that extend from channel 214 and channel 216 through fluid-transfer plate 204) may be considered functional implementations of inlet 126 and outlet 130 as shown in FIG. 1.

Similarly, recess 218 and recesses 220, formed in/on pressure plate 206, may be considered implementations of the combination of first recess 122*a* and second recess 122*b* with first gas channel 124*a* and second gas channel 124*b*. As shown by recess 218, some embodiments may include a single recess for controlling fluid transfer through all fluid paths from a set of inlet and outlet channels (e.g., 214 and 216). As shown by recesses 220, some embodiments may include a separate recess for controlling fluid transfer through each fluid path from a set of inlet and outlet channels (e.g., 214 and 216). In either case, each of recess 218 or recesses 220 may be surrounded by a sealing structure 222 or sealing structures 224. Although sealing structure 222 and sealing structures 224 are shown as grooves or channels around recess 218 and recesses 220, other sealing structures may be used. The features of pressure plate 206 will be explained in more detail with respect to FIG. 5.

FIG. 3 shows features of the top side of a fluid-transfer plate 300. As shown, in addition to features for providing structural support (bores around the exterior of the plate), fluid-transfer plate 300 may include, for example, channel 302 and channel 304. Also as shown, channel 302 and channel 304 may each include a widened area (306 and 310) for receiving fluid into the channel. Although widened area 306 and widened area 310 are shown at opposite ends of channel 302 and channel 304, fluid receiving structures may be placed anywhere along the fluid channels, and need not be limited to a slight rounding and widening of the channel. In some cases, no alteration is necessary for receiving fluid into a channel. Although fluid-transfer plate 300 shows two sets of inlet and outlet channels, and fluid-transfer plate 204 shows three sets of inlet and outlet channels, any number of channels may be used in an illustrative embodiment. Additionally, sets of inlet and outlet channels may be shaped, oriented, and connected in ways other than those shown in the figures. As one alternative example, the inlet and outlet channels may be circular or semicircular shape and oriented in an annular arrangement with respect to one another. Many other alternatives are possible.

Along the length of channel 302 and channel 304, bores 308 and bores 312 are formed to provide fluid flow paths through fluid-transfer plate 300. As shown, bores 308 and bore 312 may be offset from the center of channel 302 and channel 304, respectively. Such an offset may be useful in designing valves to transfer fluid at high rates, because the closer the inlet bores are to their respective outlet bore, the shorter the distance the fluid must travel. Additionally, if the pressure recesses for controlling the valves are similar in shape to first recess 122a and second recess 122b of FIG. 1, then the offset bores would be more centrally located with respect to the pressure recess(es). In particular, when a pressure recess has a rounded and/or sloping shape, bores offset towards the center of the pressure recess would be located under a deeper portion of the recess than a bore in the middle of channel 302 or channel 304. When open, a bore beneath a deeper recess may accommodate a faster flow rate because of the larger maximum open volume above the bore. However, in other embodiments, bores 308 and/or bores 312 may, alternatively, be formed in the center of channel 302 and channel 304, respectively, or even formed offset to the outside of channel 302 and channel 304.

The sizing of bores 308 and bores 312 is an important feature of present embodiments to optimize fluid flow and pressure drop. In typical fluid transfer systems, single larger bores are used to maintain a high flow rate by reducing the flow velocity and pressure drop across the valve. Insufficient flow area can result in unacceptable pressure drop and/or flow velocities high enough to cause turbulent flow and/or spontaneous vaporization ("flashing") of a fluid as fluid passes through the valve. However, the present inventors have recognized that such large-bore implementations may have inherent limitations in flexible-diaphragm based valve systems. If the bore diameter becomes too large, for example, physical damage and/or permanent deformation of the diaphragm can occur during operation. Physical damage may result in a breach or perforation of the diaphragm. Permanent deformation may result in a compromised (e.g., perforated) seal in a closed state or inability of fluid pressure to produce sufficient deflection of the diaphragm into the recess in the open state.

Because excessive permanent deformation of diaphragm 138 results in decreased performance of the valve block 200, the bores 308 and bores 312 should be sized large enough such that sufficient flow is permitted, but sized small enough to prevent an unacceptable amount of permanent deformation of diaphragm 138. Decreased performance of the valve can include a reduced flow rate, blocked flow, and/or unacceptably high pressure drop through the valve in an open state. Permanent deformation of diaphragm can be caused by a combination of pressure and temperature. For example, gas pressure in gas channel 124a (or gas channel 124b) can put stress on the elasticity of diaphragm 138 causing permanent deformation. That is, diaphragm 138 can be permanently deformed if the diaphragm 138 does not return to its original (or substantially original) shape under non-pressurized conditions. The extent of permanent deformation can be sufficient to prevent the diaphragm from fully deflecting into the recess under fluid pressure, therefore impinging upon and restricting fluid flow from inlet 126 to outlet 130, resulting in increased flow velocity and pressure drop. In another example, if the temperature of the fluid contacting diaphragm is too high, diaphragm 138 can become permanently deformed by wearing down the elasticity of the diaphragm 138. In particular, a combination of high fluid temperature and high gas pressure can cause an unacceptable amount of permanent deformation. As such, as the fluid temperature rises, the minimum gas pressure required to cause permanent deformation of diaphragm 138 falls.

The diameter size of the bores 308 and bores 312 can be a factor in determining pressure drop across the diaphragm 138 for a given flow rate. For example, if the diameter size of fluid inlet bores (e.g. 308) is small, the fluid velocity can increase the pressure drop across the diaphragm 138. In another example, if the outlet bores (e.g., 312) are small, the outlet bores can restrict flow through the valve, creating higher fluid velocity and therefore a higher differential pressure across the valve at the diaphragm 138. If bores 308 or 312 are too large, then the diaphragm 138 can experience deformation that exceeds the elasticity of the material. That is, the diaphragm 138 can be deformed in a manner such that the diaphragm 138 does not return to its original (or substantially original) shape under non-pressurized conditions.

FIG. 13 is a table that shows the results of an experiment regarding deformation of a diaphragm of a valve in accordance with an illustrative embodiment. In the experiment, a test valve in accordance with the present disclosure was constructed having four identical rows, each with six different bore diameters. The six different bore diameters were 0.050 inches, 0.063 inches, 0.070 inches, 0.075 inches, 0.094 inches, and 0.099 inches. Four identical diaphragms of 0.01 inch thick PFA were used, each under different test conditions for twenty-four hours. The first test condition was at a temperature of 20° C. at 150 psi. The second test condition was at a temperature of 20° C. at 300 psi. The third test condition was at a temperature of 65° C. at 150 psi. The fourth test condition was at a temperature of 65° C. at 300 psi. After each test condition, the diaphragm was removed from the valve body and the deformation of the diaphragm corresponding to the various bores was measured using an analog height indicator. The average deformation of the diaphragm in inches corresponding to each bore diameter under each pressure and temperature condition shown in the table of FIG. 13. Also shown in the table of FIG. 13 is the corresponding pressure increase due to the deformation calculated using an assumed flow rate of 2.5 L/min of water at 20° C. through a valve having the corresponding bore diameter and with a recess depth of 0.020 inches.

As mentioned above, FIG. 13 shows the results under four different test conditions. For example, at a temperature of 65° C. and at a pressure of 150 psi, the diaphragm corresponding to the bore diameter of 0.050 inches had an average deformation of 0.0012 inches and a 2.4 percent (%) increase in pressure. At the same temperature and pressure, the diaphragm corresponding to the bore diameter of 0.070 inches had an average deformation of 0.0019 inches and a 5.3% increase in pressure.

The present inventors have determined that pressure increases greater than 10% are unacceptable and correspond to excessive permanent deformation of the diaphragm. The corresponding deformation ranges from 0.0035 inches to 0.005 inches. An "unacceptable" amount of deformation is determined if the valve has either (A) an increase of pressure drop across the valve of greater than 10 psi at 2.5 L/min of water at 20° C. or (B) permanent deformation of the diaphragm greater than 35% of the original thickness of the diaphragm.

Because a slight amount of permanent deformation of the diaphragm 138 can be tolerated, larger bore diameters can be used with less severe process conditions. For example, bore diameters of 0.075 inches or more can be used with fluid pressures of 150 psi and with fluid temperatures of 20° C. for at least 24 hours without significant permanent deformation to the diaphragm 138. However, if the fluid pressure is raised to 300 psi, enough permanent deformation to the diaphragm 138 can occur to degrade the performance of the valve.

Another factor that can affect the permanent deformation of diaphragm 138 is the shape and depth of recesses 220. In one embodiment, recesses 220 can be an oval shape. In other embodiments, recesses 220 can be circular. Depth of recesses 220 can also affect the permanent deformation of diaphragm 138 because if the depth is too deep, then deformation of the diaphragm 138 during operation of the valve can exceed an elasticity of the diaphragm 138. In some embodiments, a depth of recesses 220 can be 0.010 inches (10 mil). In another embodiment, a depth of recesses 220 can be 0.020 inches (20 mil). In other embodiments, a depth of recesses 220 can be between 0.010 inches and 0.020 inches. In yet other embodiments, a depth of recesses 220 can be less than 0.010 inches or greater than 0.020 inches.

In some embodiments, the shape of bores 308 and bores 312 can be circular. In other embodiments, the shape of bores 308 and bores 312 can be oval shaped. In yet other embodiments, the shape of bores 308 and bores 312 can be slot shaped. In some embodiments, the bores 308 and bores 312 can be chamfered. The shape of bores 308 and bores 312 can be any shape designed to minimize permanent deformation of the diaphragm at operating pressures and temperatures. The shape of bores 308 and bores 312 can further be designed such that there is a desired pressure drop and fluid velocity across the valve at the desired flow rate.

In the present disclosure, multiple smaller bores may be used rather than a single large bore, in combination with the other disclosed features and systems, in order to accommodate high flow rates without the limitations of large diameter bores. In an illustrative embodiment, each bore may have a diameter of less than 0.094 inches and, in some embodiments, a diameter of 0.070 inches or less. The valve block may employ multiple bores from a single fluid source and/or multiple bores leading to a single outlet. The example of FIG. 3 shows channel 302 and channel 304 having seven bores each. In some embodiments, a greater number of bores may be included in each channel in order to accommodate a faster flow rate and/or reduce pressure drop. In some embodiments, a greater number of bores may be provided that have a smaller diameter such that the valve can have a similar pressure drop and fluid velocity at a given flow rate to a valve with a fewer number of bores with a larger diameter. The embodiment of FIG. 3, however, may be sufficiently optimized by utilizing seven bores of about 0.07 inches in diameter, spaced about 0.25 inches apart (from center of bore to center of bore) along the inlet or outlet channel (304 or 302) and a distance of about 0.25 inches between one inlet bore and one outlet bore on the upper side of the fluid transfer plate. Channel 302 and channel 304 may be separated by about 0.312 inches from the center of the channel 302 to the center of the channel 304 on the top side of the fluid-transfer plate 300.

FIG. 4 shows features of the bottom side of fluid-transfer plate 300 in accordance with an illustrative embodiment. As with the top side of fluid-transfer plate 300, shown in FIG. 3, the bottom side of fluid transfer plate 300 contains bores therethrough for structural support or fluid transfer. In particular, bores 400 and bores 402 correspond with bores 308 and 312 of the top side of plate 300. Between bores 400 and bores 402, there is a raised portion 404 of fluid-transfer plate 300 that may act as a barrier between the inlet and outlet bores. In particular, as shown in the simplified valve structure of FIG. 1, when the diaphragm is pushed up onto the bottom side of the fluid-transfer plate 300, the contact between the diaphragm and raised portion 404 constitutes a fluid barrier, preventing flow from bores 400 to bores 402. When in an open valve state, fluid flows up over raised portion 404 from the inlet bores (e.g., 400) to the outlet bores (e.g., 402) and through fluid-transfer plate 300 from the inlet channel (e.g., 302) to the outlet channel (e.g., 304). In an illustrative embodiment, bores 400 may be sufficiently equivalent to bores 402, such that users may choose to flow fluid in either direction. The illustrated sizing and spacing of the bores on the bottom side of fluid-transfer plate 300 are merely for illustrative purposes, and are not intended to be limiting the scope of the disclosure.

Figure 5:
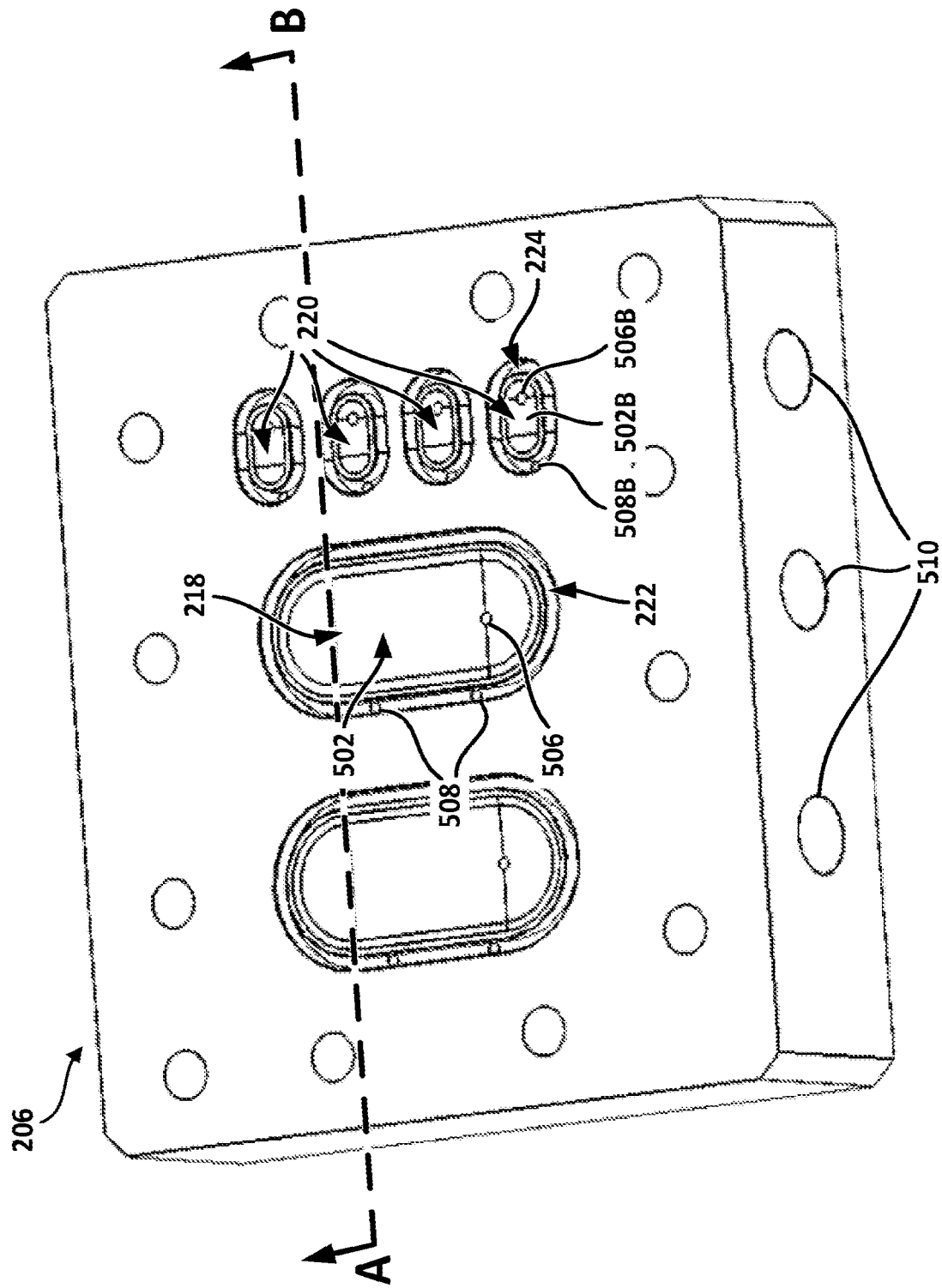
FIG. 5 shows a perspective view of a pressure plate in a valve block according to an illustrative embodiment.
Figure 6:
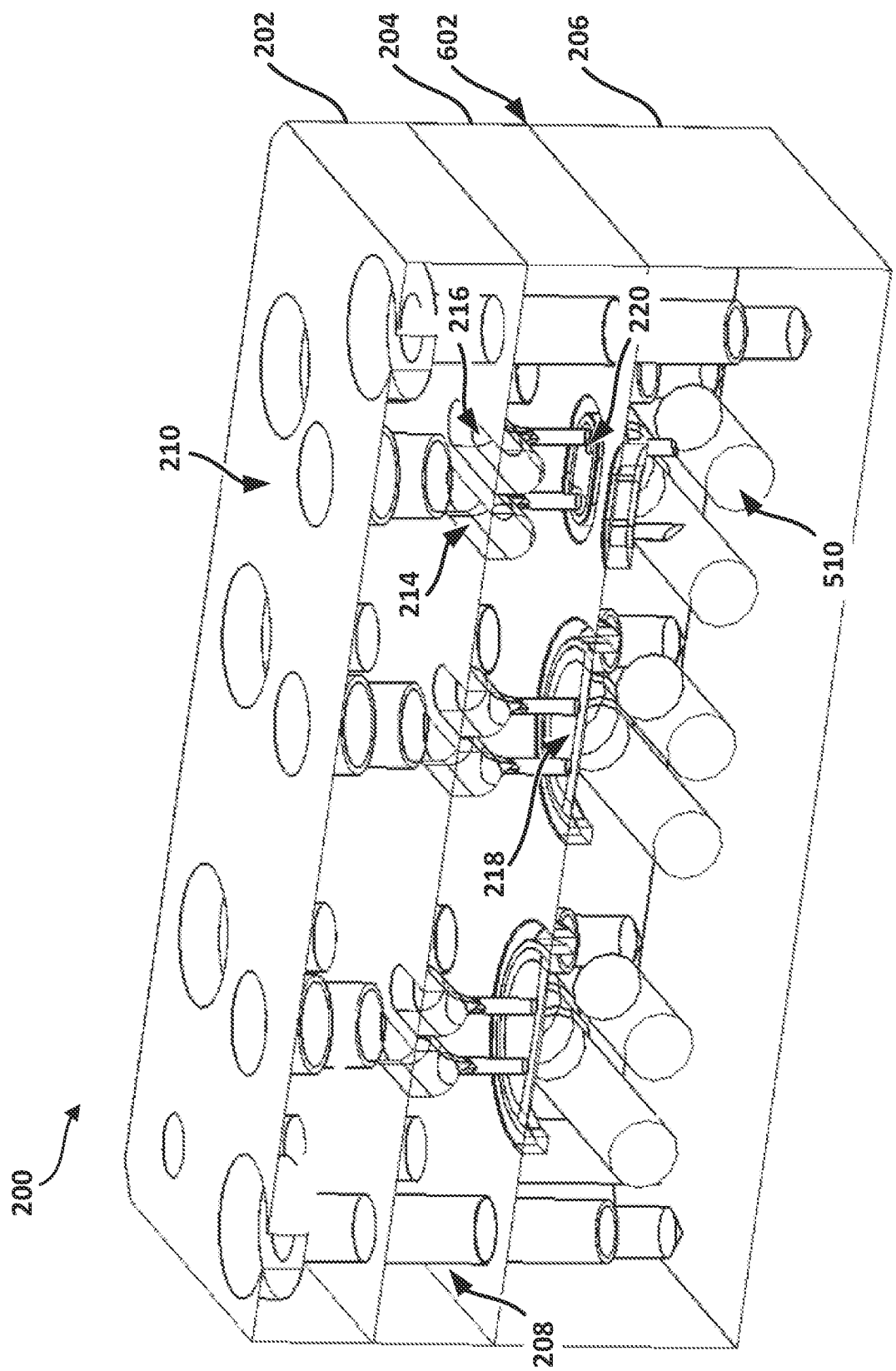
FIG. 6 shows a perspective view of a cross-section of an assembled valve block in accordance with an illustrative embodiment.

As will be shown in greater detail in FIG. 6, fluid-transfer plate 204 may be brought into connection with a pressure plate, such as pressure plate 206, in order to control the opening and closing of the fluid channels, as previously discussed. FIG. 5 shows a perspective drawing of an example pressure plate 206 that can be used in combination with a fluid-transfer plate to produce a valve system. As discussed above, a flexible diaphragm 602 is placed between the fluid-transfer plate 204 and the pressure plate 206. In order to provide space for structural supports, bores are bored or otherwise formed at least partially through pressure plate 206, as shown by the peripheral bores shown in FIG. 5. Additionally as shown, pressure plate 206 includes recesses, such as recess 218 and recesses 220, which may be aligned with bores and raised portions on the bottom of a fluid-transfer plate 204.

As discussed above, a valve diaphragm composed of a pliant pressure responsive material (e.g., diaphragm 138 or 602) is disposed between the upper surface of the pressure plate (e.g., 120 or 206) and the lower surface of the fluid-transfer plate (e.g., 300 or 204). The diaphragm 138 lacks bores except where used for screws or other fasteners for holding the assembly together. For use in SMB chromatography, there is a barrier plate or gasket forming a sealing interface at the upper surface of the fluid-transfer plate (e.g., 300 or 204), forming an upper barrier wall to the fluid egress and ingress channels (e.g., channel 302 and channel 304). The plate or gasket also has column access bores to communicate with chromatographic columns and the ingress and egress channels. Finally above the barrier plate or gasket there is an anchor (top) plate 202 having an upper and a lower surface containing column communicating bores in alignment with the chromatographic columns and the ingress and egress channels.

Recess 218 and recesses 220 may each include a recessed portion 502 and recessed portion 502B, some form of fluid seal (e.g., sealing structure 222 and sealing structures 224), and bore 506, bores 508, bore 506B and bore 508B. Bore 506 may be considered the functional implementation of first gas channel 124a and second gas channel 124b shown in FIG. 1. In some embodiments, bore 506 and bore 506B may be a pressure inlet and a venting outlet, used respectively for increasing the pressure in recessed portion 502 and recessed portion 502B in order to produce a valve closed state, and for venting said pressure to establish a valve open state. Bores 508 and bore 508B may be pressure inlet ports to sealing structure 222 and sealing structures 224 (which can be o-ring channels). Sealing structure 222 and sealing structures 224 may be a circumferential groove or channel encompassing the perimeter of recessed portion 502 and recessed portion 502B and containing any type of fluid sealing mechanism that may maintain pressure in recessed portion 502 and recessed portion 502B. For example, a fluid sealing mechanism installed within sealing structure 222 may be an o-ring, flexible gasket, blade gasket, labyrinth seal, U-cup, a pressure cup, or a combination of these or other sealing architectures. Similarly, sealing structures 224 are located around the perimeters of recesses 220 and may contain a fluid sealing mechanism as described above with reference to sealing structure 222. Pressure may be applied to sealing structure 222 and sealing structures 224 through bores 508 and bore 508B to increase the seal force applied by the fluid sealing mechanism. In an example embodiment, fluid pressure through bores 508 and bore 508B may be independent of the pressure/flow of pressurized material through bore 506 and bore 506B. More, fewer, or different bores, seals, and structures than those shown in the figures may be utilized in an example recess. Although elements 224, 502B, 506B, and 508B are only labeled with respect to one of recesses 220, FIG. 5 shows that each of recesses 220 may include similar structures.

As shown, in addition to a single pressure valve (e.g., recess 218) controlling all channels of a valve inlet/outlet, multiple recesses (e.g., recesses 220) may individually control fluid flow between each set of bores. Although the example of FIGS. 2 and 5 show four recesses, any number of recesses may be utilized in order to ensure as flexible a structure as needed for a particular application. In practice, since each set of bores may connect to the same inlet or outlet channel, the individual control of the sets of bores may be used primarily in controlling the particular flow rate of fluid. For example, if a certain application requires a fluid to maintain a particular flow regime (e.g., laminar, turbulent, subsonic, supersonic, transitional), establish a specific linear flow velocity, or maintain or establish a certain pressure differential, then the number of fluid pathways utilized may be adjusted to cause fluid to conform to the desired flow regime. As another example, if a system detects that a valve around a particular set of bores has become damaged, the system may responsively cut off fluid flow through the damaged valve by maintaining a continuous closed state for that valve. Other example applications of the independent control of different fluid channels may also be used. Additionally, the valves between one inlet and outlet need not be limited to either all a single collective valve or independent control. For example, a combination of multiple-bore valves and single-bore valves may be produced.

Any controllable material may be used as a source of pressure in pressure plate 206. In order to maintain independent control of the different valves, a system may have multiple inlets 510 for pressurized material. In particular, the number of pressurized material inlets may be equal to the number of controllable recesses in the plate. The pressure of each of these inlets 510 may be controlled at the valve block or in a separate the control system connected to inlets 510. In an example embodiment, the pressurized material in pressure plate 206 is different than the fluid being transferred in fluid-transfer plate 300. Accordingly, the material and manufacture of the diaphragm may be selected to prevent mixing between the pressurized material and the transferred fluid.

FIG. 6 shows a cross-section of valve block 200 as assembled, taken at line A-B (shown in FIG. 5). As shown, bore 208 (which can be used for structural support) extends into each of top plate 202, fluid-transfer plate 204, diaphragm 602, and pressure plate 206. Additionally, bore 210 is positioned such that it connects with the widened area of channel 214 (which can be an inlet channel), providing essential fluid flow down to recess 220. At recess 220, pressurized material from inlet 510 may provide sufficient pressure to diaphragm 602 in order to close recess 220 and prevent flow of the fluid from channel 214 to channel 216.

Figure 7:
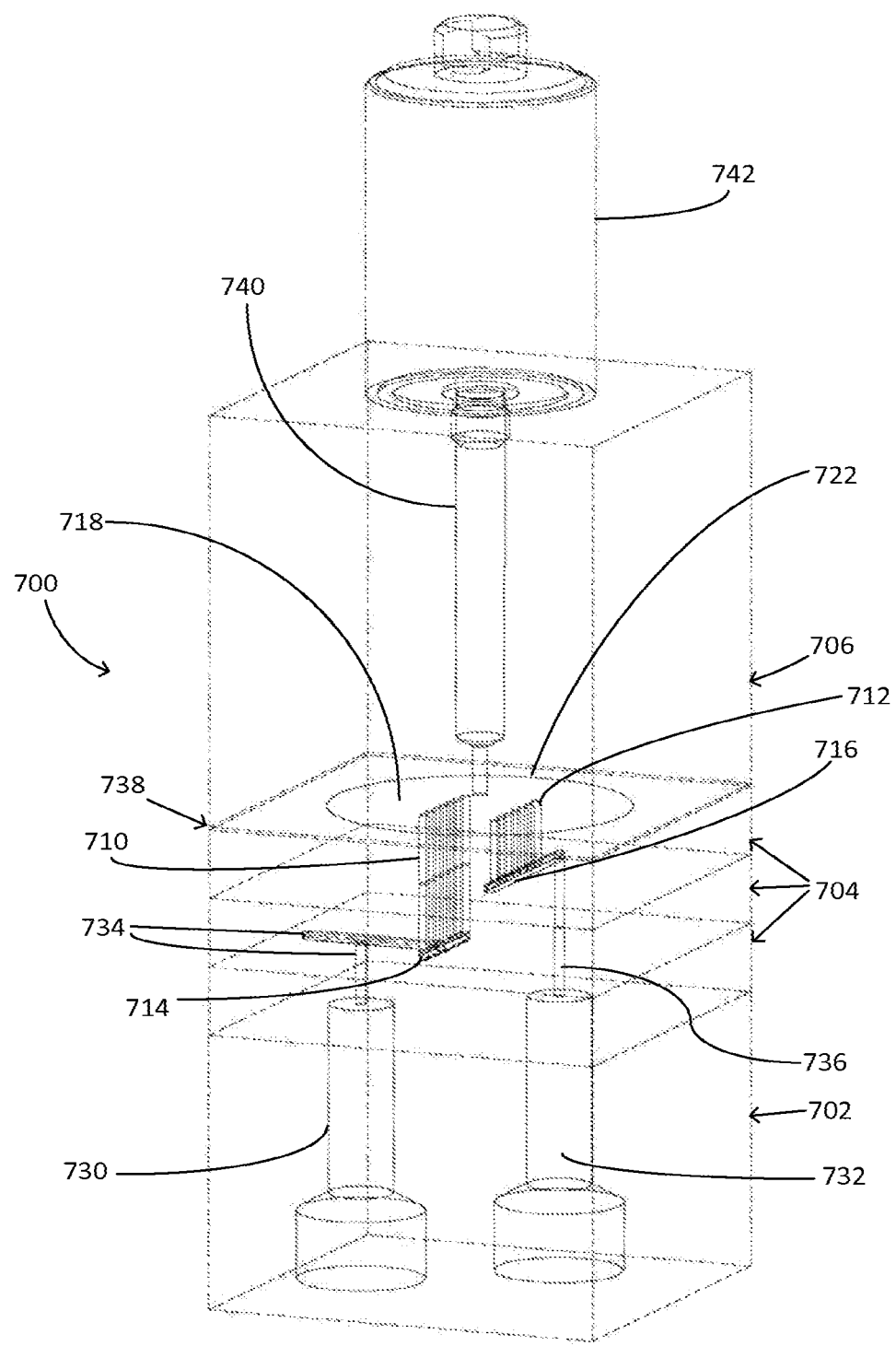
FIG. 7 shows a perspective view of an assembled valve block with seven inlet bores and seven outlet bores in accordance with an illustrative embodiment.

FIG. 7 shows a perspective view of an assembled valve block 700 with seven inlet bores 710 and seven outlet bores 712 in accordance with an illustrative embodiment. Valve block 700 has a top plate 702, a fluid-transfer plate 704, a pressure plate 706, and a diaphragm 738. As shown in FIG. 7, fluid-transfer plate 704 can be comprised of multiple (e.g., three) plates. The use of multiple plates can be useful in manufacturing the various bores and channels. In some embodiments fluid-transfer plate 704 can be comprised of more than three or less than three individual plates.

Top plate 702 can include an inlet connection bore 730 and an outlet connection bore 732. Inlet connection bore 730 and outlet connection bore 732 can be configured to fluidly connect valve block 700 to a manufacturing, chemical, biological, or other fluid based process (e.g., an SMB process). Inlet connection bore 730 can be configured to fluidly connect inlet bores 710 with an inlet from the fluid based process. Outlet connection bore 732 can be configured to fluidly connect outlet bores 712 with an outlet to the fluid based process.

Fluid-transfer plate 704 includes inlet channels 734 and an outlet channel 736. Inlet channels 734 are configured to fluidly connect inlet connection bore 730 to inlet channel 714. Outlet channel 736 is similarly configured to fluidly connect outlet connection bore 732 to outlet channel 716. Although FIG. 7 shows two straight sections of inlet channels 734, any number of straight sections can be used (e.g., one straight section, as in outlet channel 736). Further, the straight sections of inlet channels 734 need not be straight, but can be any shape configured to transfer fluid from inlet connection bore 730 to inlet channel 714. Similarly, although FIG. 7 shows a single straight section comprising outlet channel 736, any number of straight sections can be used (e.g., two straight sections, as in inlet channel 734). Further, the straight sections of outlet channels 736 need not be straight, but can be any shape configured to transfer fluid from outlet channel 716 to outlet connection bore 732.

Fluid-transfer plate 704 can further comprise inlet channel 714, outlet channel 716, a plurality of inlet bores 710, and a plurality of outlet bores 712. Although FIG. 7 shows seven inlet bores 710 and seven outlet bores 712, any other number of inlet bores 710 and outlet bores 712 can be used. For example, fluid-transfer plate 704 can have five inlet bores 710 and five outlet bores 712. In another example, fluid-transfer plate 704 can have one inlet bore 710 and one outlet bore 712. In yet another example, fluid-transfer plate 704 can have more than seven inlet bores 710 and more than seven outlet bores 712. Inlet channel 714 fluidly connects inlet channel 734 to each of inlet bores 710. Similarly, outlet channel 714 fluidly connects outlet channel 736 with each of outlet bores 712.

Pressure plate 706 includes a recess 718, a sealing structure 722, and a pressure inlet 740. Pressure inlet 740 can be configured to supply or release pressurized material into and out of recess 718. Sealing structure 722 can be configured to prevent the pressurized material from escaping from the recess 718 except through the pressure inlet 740. Sealing structure 722 can further be configured to prevent process fluid from escaping from recess 718 except through outlet bores 712 (or inlet bores 710). Diaphragm 738 can be disposed between the pressure plate 706 and the fluid-transfer plate 704. As discussed above, as pressurized material is introduced into recess 718 via pressure inlet 740, diaphragm 738 can be pressed against fluid-transfer plate 704, thereby preventing fluid from flowing between inlet bores 710 and outlet bores 712. As pressurized material is removed from recess 718, fluid pressure from fluid-transfer plate 704 can cause the diaphragm 738 to deflect into recess 718, thereby permitting fluid to flow between inlet bores 710 and outlet bores 712 through recess 718. Gas valve 742 can be configured to introduce pressurized material into pressure inlet 740 and recess 718. Gas valve 742 can further be configured to remove pressurized material from pressure inlet 740 and recess 718.

FIGS. 8A and 8B show cross-sections of an assembled valve block 700 with seven inlet bores 710 and seven outlet bores 712 in accordance with an illustrative embodiment. FIG. 8A is a side perspective cross-section view of the valve block 700 shown in FIG. 7. FIG. 8B is a side perspective cross-section of the valve block 700 shown in FIGS. 7 and 8A, with a cross section indicated by lines B-B in FIG. 8A. The valve blocks shown in FIGS. 8A and 8B can have the same elements configured in the same way as discussed above with reference to FIG. 7.

Figure 9:
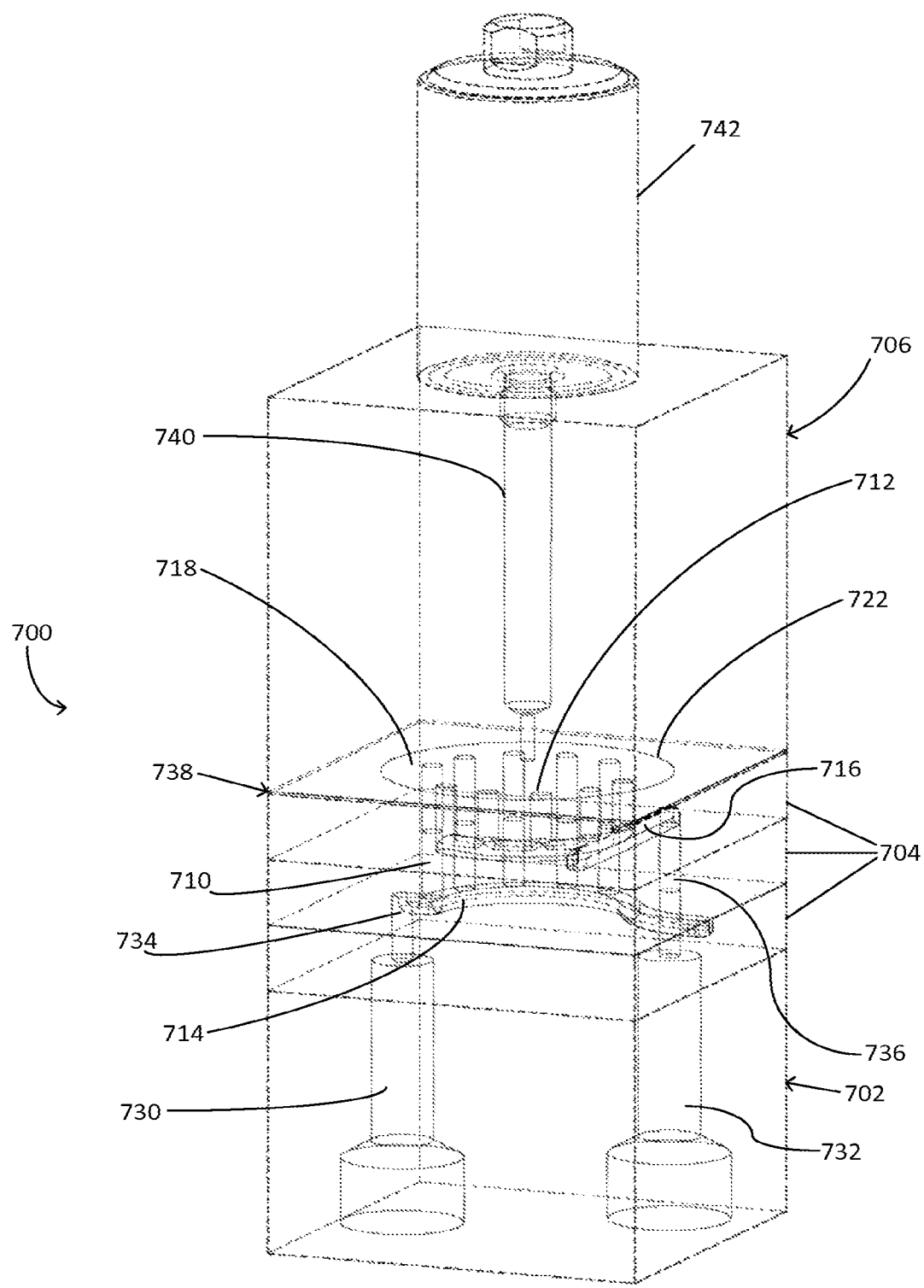
FIG. 9 shows a perspective view of an assembled valve block with five inlet bores and five outlet bores in accordance with an illustrative embodiment.

FIG. 9 shows a perspective view of an assembled valve block 700 with five inlet bores 710 and five outlet bores 712 in accordance with an illustrative embodiment. FIGS. 10A and 10B show cross-sections of an assembled valve block 700 with five inlet bores 710 and five outlet bores 712 in accordance with an illustrative embodiment. FIG. 10A is a side perspective cross-section view of the valve block 700 shown in FIG. 9. FIG. 10B is a side perspective cross-section of the valve block 700 shown in FIGS. 9 and 10A, with a cross section indicated by lines B-B in FIG. 10A. The valve blocks shown in FIGS. 9, 10A and 10B can have the same elements configured to operate in a similar fashion as discussed above with reference to FIG. 7.

FIGS. 11A-11F show various views of an assembled valve block comprising multiple valves in accordance with an illustrative embodiment. As shown in FIG. 11A, a valve block with multiple valves can have varying configurations of inlet connection bore 730 and outlet connection bore 732 (and corresponding inlet channels 714 and outlet channels 716). In the embodiment shown in FIGS. 11A and 11D, the valve block can have inlet connection bores 730 that can provide a fluid inlet to multiple valves. FIG. 11D is a front view of the valve block and FIG. 11F is a rear view of the valve block. Additionally, the valve block can have multiple outlet connection bores 732 that provide a fluid outlet for multiple valves. In some embodiments, the inlet connection bore 730 can act as an outlet and the outlet connection bore 732 can act as an inlet. FIGS. 11B and 11C show a perspective view of the valve block with multiple valves and the various bores and channels corresponding to each valve in accordance with an illustrative embodiment. FIG. 11E shows a cut-away side perspective of a valve block with multiple valves in accordance with an illustrative embodiment.

Figure 12B:
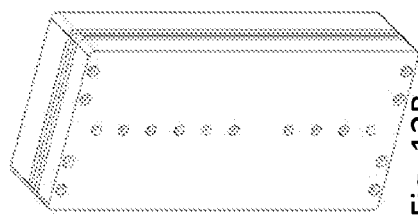
FIGS. 12A-12G show various views of an assembled valve block comprising multiple valves in accordance with an illustrative embodiment.
Figure 12C:
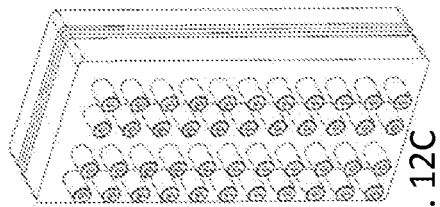
Figure 12G:
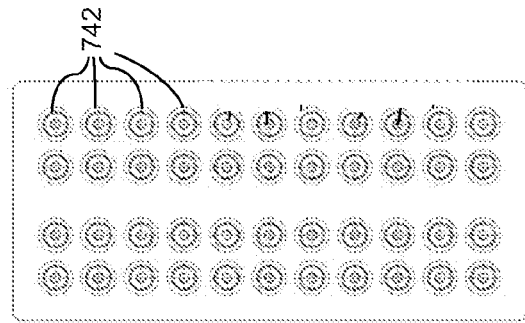
Figure 12F:
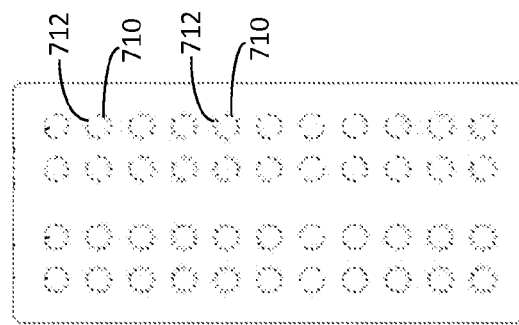
Figure 12E:
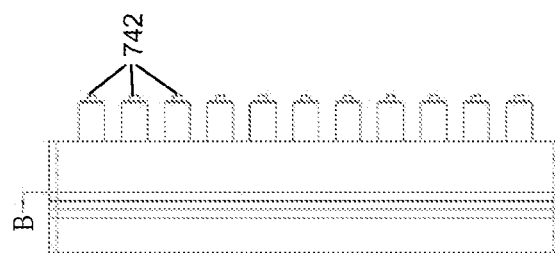
Figure 12A:
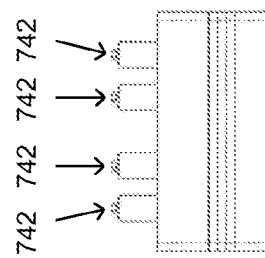
Figure 12D:
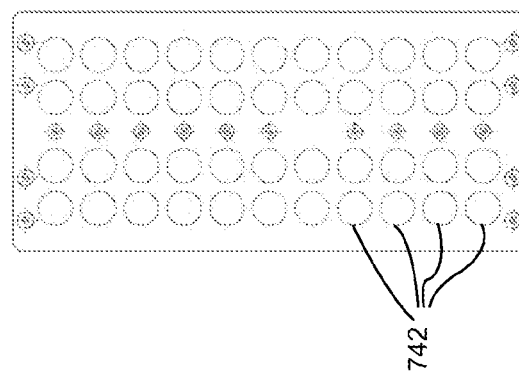

FIGS. 12A-12G show various views of an assembled valve block comprising multiple valves in accordance with an illustrative embodiment. FIG. 12A shows a side perspective of the valve block. As shown in FIGS. 12C, 12D, and 12E, the valve block can have multiple valves within the same valve block. FIG. 12F shows an embodiment of the bottom side of a fluid-transfer plate 704 that comprises five inlet bores 710 and five outlet bores 712 in accordance with an illustrative embodiment. As shown in FIG. 12F, the inlet bores 710 and the outlet bores 712 can be configured in an annular shape. FIG. 12G shows a view of pressure plate 706 with gas valves 742 in accordance with an illustrative embodiment. FIGS. 12B and 12C show perspective views of the outside surface of an assembled valve block comprising multiple valves in accordance with an illustrative embodiment.

The construction and arrangement of the elements of the systems and methods as shown in the illustrative embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. Additional information regarding the present valve block designs are also discussed in U.S. Pat. No. 8,196,603, which is incorporated herein by reference in its entirety.

Additionally, in the subject description, the words "illustrative" or "exemplary" are used to mean serving as an example, instance, or illustration. Any embodiment or design described herein as "illustrative" is not necessarily to be construed as preferred or advantageous over other embodiments or designs. Rather, use of the word illustrative is intended to present concepts in a concrete manner. Accordingly, all such modifications are intended to be included within the scope of the present disclosure. The order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other illustrative embodiments without departing from scope of the present disclosure or from the scope of the appended claims.

All such variations are within the scope of the disclosure. Likewise, software implementations could be accomplished with standard programming techniques with rule-based logic and other logic to accomplish the various connection steps, processing steps, comparison steps and decision steps.

What is claimed is:

1. A valve block comprising:
    a pressure plate comprising:
        a recess fillable with a material;
    a first fluid transfer plate comprising:
        a plurality of inlet bores extending through the first fluid transfer plate; and
        a plurality of outlet bores extending through the first fluid transfer plate, at least one of the plurality of inlet bores and the plurality of outlet bores is arranged along a perimeter of a polygonal shape;
    a second fluid transfer plate comprising:
        an inlet channel fluidly coupled to the plurality of inlet bores; and an outlet channel fluidly coupled to the plurality of outlet bores; and a diaphragm disposed between a surface of the pressure plate and the surface of the first fluid transfer plate, wherein the diaphragm is configured to selectively control flow of a fluid from the plurality of inlet bores to the plurality of outlet bores.

2. The valve block of claim 1, wherein the plurality of inlet bores is arranged along a perimeter of a first polygonal shape and the plurality of outlet bores is arranged along a perimeter of a second polygonal shape.

3. The valve block of claim 1, wherein each inlet bore of the plurality of inlet bores has a diameter of 0.070 inches or less, and wherein each of the plurality of outlet bores has a diameter of 0.070 inches or less.

4. The valve block of claim 3, wherein the valve block is further configured to allow 2.5 liters per minute of the fluid through the plurality of inlet bores at a pressure drop of less than or equal to 10 pounds per square inch per valve.

5. The valve block of claim 1, wherein the recess comprises an oval shaped cross section, and wherein a depth of the recess is between 0.01 inches and 0.02 inches.

6. The valve block of claim 1, further comprising a top plate disposed adjacent to the fluid transfer plate, the top plate comprising an inlet connection bore and an outlet connection bore, wherein the inlet connection bore is fluidly connected to the inlet channel and the outlet connection bore is fluidly connected to the outlet channel.

7. The valve block of claim 1, wherein a diameter of each inlet bore of the plurality of inlet bores is configured to prevent permanent deformation of the diaphragm, and wherein permanent deformation of the diaphragm corresponds to a deformation height of the diaphragm that is greater than or equal to thirty-five percent of a thickness of the diaphragm.

8. The valve block of claim 1, wherein at least one of (i) the plurality of inlet bores and (ii) the plurality of outlet bores is arranged in a curved shape.

9. The valve block of claim 1, wherein the fluid transfer plate further comprises a raised portion disposed on the surface of the fluid transfer plate between the plurality of inlet bores and the plurality of outlet bores, the raised portion extending away from the fluid transfer plate.

10. The valve block of claim 1, further comprising:
a second plurality of inlet bores disposed in the fluid transfer plate; and
a second plurality of outlet bores disposed in the fluid transfer plate, wherein the second plurality of inlet bores and the second plurality of outlet bores are included within a second valve of the valve block.

11. A valve block comprising:
a pressure plate defining a plurality of recesses fillable with material;
a first fluid-transfer plate comprising:
a plurality of valves, each valve comprising:
a plurality of inlet bores distributed along a perimeter of a first polygonal shape; and
a plurality of outlet bores distributed along a perimeter of a second polygonal shape;
a second fluid-transfer plate comprising:
a plurality of inlet channels configured to fluidly couple the plurality of valves to an inlet connection bore; and
a plurality of outlet channels configured to fluidly couple the plurality of valves to an outlet connection bore; and
a diaphragm disposed between the first fluid-transfer plate and the pressure plate, wherein the diaphragm is configured to selectively control flow of a fluid from the plurality of inlet bores to the plurality of outlet bores.

12. The valve block of claim 11, wherein each valve of the plurality of valves further comprises a top plate disposed adjacent to the fluid transfer plate, the top plate comprising the inlet connection bore and the outlet connection bore, wherein the inlet connection bore is fluidly connected to the plurality of inlet channels and the outlet connection bore is fluidly connected to the plurality of outlet channels.

13. The valve block of claim 11, wherein each inlet bore of the plurality of inlet bores has a diameter of 0.070 inches or less, and wherein each outlet bore of the plurality of outlet bores has a diameter of 0.070 inches or less.

14. The valve block of claim 11, wherein each inlet bore of the plurality of inlet bores has an annular cross sectional shape.

15. The valve block of claim 11, wherein each recess of the plurality of recesses has an oval shaped cross section.

16. The valve block of claim 11, wherein the first polygonal shape is a same shape as the second polygonal shape.

17. A valve block comprising:
a first fluid-transfer plate;
a second fluid-transfer plate;
a pressure plate defining a plurality of recesses each fillable with a material; and
a plurality of valves, wherein each valve comprises:
a plurality of inlet bores extending through the first fluid-transfer plate;
a plurality of outlet bores extending through the first fluid-transfer plate, at least one of the plurality of inlet bores and the plurality of outlet bores being distributed along a polygonal shape;
an inlet channel formed in the second fluid-transfer plate and fluidly coupled to the plurality of inlet bores;
an outlet channel formed in the second fluid-transfer plate and fluidly coupled to the plurality of outlet bores; and
a diaphragm disposed between a surface of the first fluid-transfer plate and a surface of the pressure plate, wherein the diaphragm is configured to selectively control flow of a fluid from the plurality of inlet bores to the plurality of outlet bores.

18. The valve block of claim 17, wherein a diameter of the plurality of inlet bores is configured to prevent permanent deformation of the diaphragm.

19. The valve block of claim 17, wherein the plurality of inlet bores comprises seven inlet bores, and wherein the plurality of outlet bores comprises seven outlet bores.

20. The valve block of claim 17, further comprising separate gas valves to independently pressurize each of the plurality of recesses.

* * * * *